(12) United States Patent
Schoonover et al.

(10) Patent No.: US 11,235,730 B2
(45) Date of Patent: Feb. 1, 2022

(54) EXTRUDED AIRBAG RAMP

(71) Applicant: Vintech Industries, Inc., Imlay City, MI (US)

(72) Inventors: James C. Schoonover, Shelby Township, MI (US); Robert Rutoski, Imlay City, MI (US)

(73) Assignee: Vintech Industries, Inc., Imlay City, MI (US)

( * ) Notice: Subject to any disclaimer, the term of this patent is extended or adjusted under 35 U.S.C. 154(b) by 57 days.

(21) Appl. No.: 16/696,332

(22) Filed: Nov. 26, 2019

(65) Prior Publication Data

US 2020/0164826 A1 May 28, 2020

Related U.S. Application Data

(60) Provisional application No. 62/771,355, filed on Nov. 26, 2018.

(51) Int. Cl.
*B60R 21/232* (2011.01)
*B60R 21/213* (2011.01)
*B60R 21/16* (2006.01)

(52) U.S. Cl.
CPC .......... *B60R 21/232* (2013.01); *B60R 21/213* (2013.01); *B60R 2021/161* (2013.01)

(58) Field of Classification Search
CPC . B60R 21/213; B60R 21/2176; B60R 21/232; B60R 2021/161; B60R 2021/2177
See application file for complete search history.

(56) References Cited

U.S. PATENT DOCUMENTS

| | | | | |
|---|---|---|---|---|
| 5,921,575 A * | 7/1999 | Kretschmer | .......... | B60R 21/213 280/728.2 |
| 6,103,984 A * | 8/2000 | Bowers | ................. | B60R 21/213 280/730.2 |
| 6,220,623 B1 * | 4/2001 | Yokota | .................. | B60R 21/213 280/728.2 |
| 6,231,071 B1 * | 5/2001 | Keane | ..................... | B60R 21/04 280/730.2 |
| 6,254,123 B1 * | 7/2001 | Urushi | .................. | B60R 21/213 280/730.2 |
| 6,333,515 B1 * | 12/2001 | Kubota | ................. | B60R 13/025 280/730.2 |
| 6,502,855 B1 * | 1/2003 | Greiner | ................... | B60R 13/02 280/728.2 |
| 6,565,116 B1 * | 5/2003 | Tajima | ................ | B60R 13/0206 24/297 |
| 7,182,366 B2 * | 2/2007 | Enriquez | ............... | B60R 21/213 280/728.2 |
| 7,213,836 B2 * | 5/2007 | Coon | .................... | B60R 21/213 280/730.2 |
| 7,401,805 B2 * | 7/2008 | Coon | .................... | B60R 21/201 280/730.2 |
| 7,552,940 B2 * | 6/2009 | Lindemann | ............. | B60R 21/21 280/728.2 |

(Continued)

*Primary Examiner* — Laura Freedman
(74) *Attorney, Agent, or Firm* — Warn Partners, P.C.

(57) ABSTRACT

An extruded side curtain airbag ramp including a tear-resistant material forming at least one attachment feature and method for manufacturing said extruded side curtain airbag ramp. The airbag ramp according to the present invention incorporates a plurality of extruded materials and provides an easier manufactured product and attachment.

12 Claims, 2 Drawing Sheets

(56) References Cited

U.S. PATENT DOCUMENTS

| | | | | |
|---|---|---|---|---|
| 7,621,559 | B2* | 11/2009 | Seong | B60R 21/213 |
| | | | | 280/730.2 |
| 9,004,525 | B2* | 4/2015 | Ruedisueli | B60R 21/215 |
| | | | | 280/728.2 |
| 9,193,324 | B2* | 11/2015 | Osterfeld | B60R 21/2176 |
| 10,661,747 | B2* | 5/2020 | Hioda | B60R 21/216 |
| 10,807,558 | B2* | 10/2020 | Naranjo | B60R 21/2334 |
| 2021/0114544 | A1* | 4/2021 | Nedelman | B60R 13/0212 |

\* cited by examiner

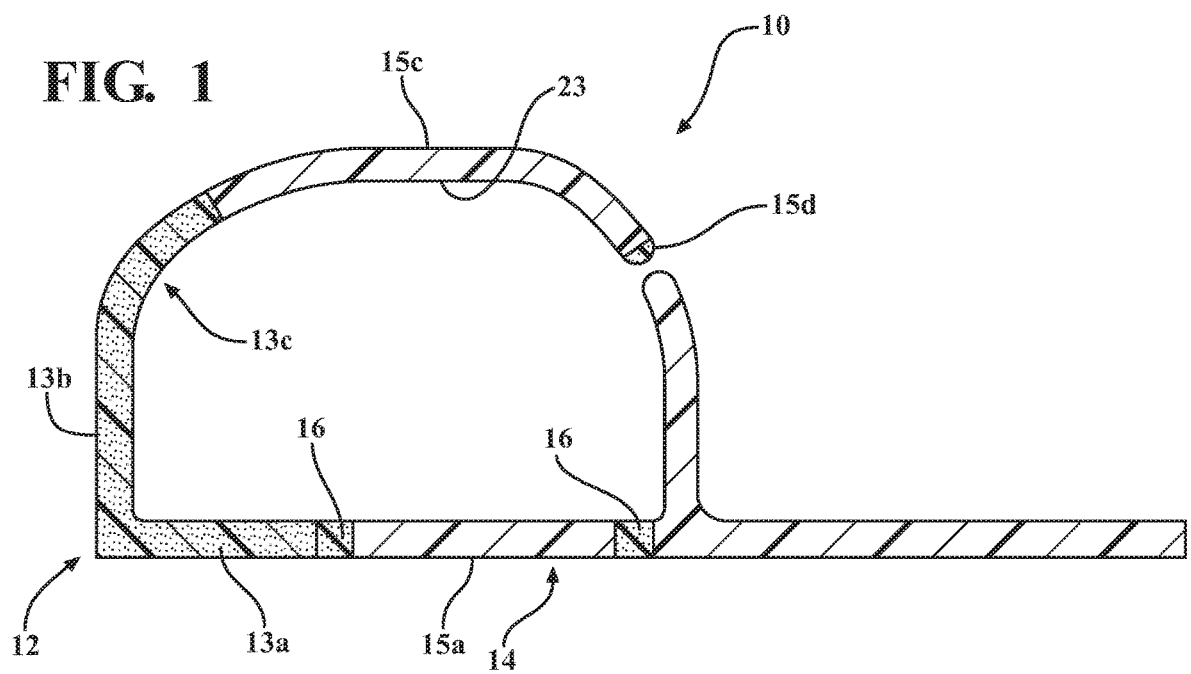
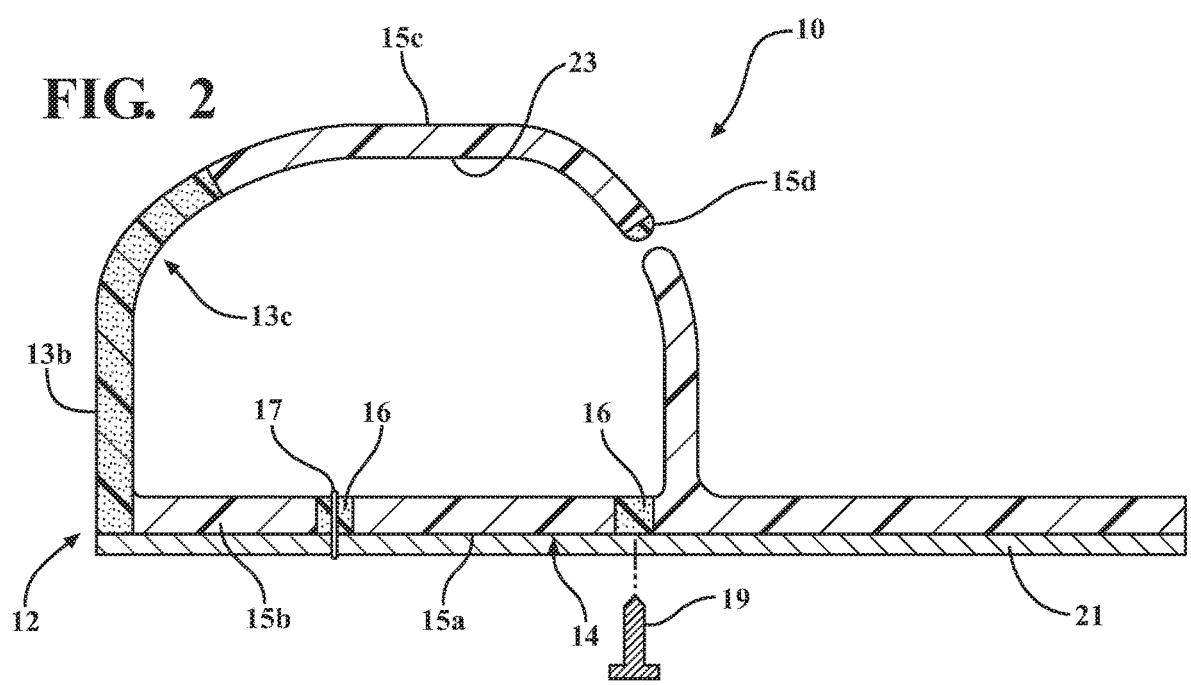
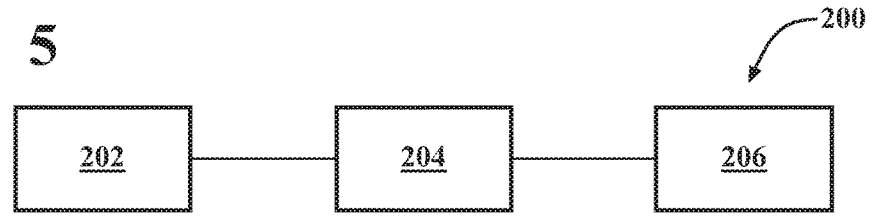

EXTRUDED AIRBAG RAMP

CROSS REFERENCE TO RELATED APPLICATIONS

This application claims the benefit of U.S. Provisional Application No. 62/771,355 filed Nov. 26, 2018. The disclosure of the above application is incorporated herein by reference.

FIELD OF THE INVENTION

The present invention relates to an automotive extruded side curtain airbag ramp and process for manufacturing same.

BACKGROUND OF THE INVENTION

Safety restraints, such as side curtain air bags are well known in the automotive industry for occupant protection in the event of a collision. In the event of a side curtain air bag deploying, an air bag ramp guides the deploying air bag to the desired cab position in the vehicle toward the predetermined position designed for helping protect the vehicle occupant.

Conventional side air bag ramps for side air bags are made from a single material, and the product designs make the ramps difficult to manufacture. In addition, the ramps are typically a plastic olefin and the polymer is tough. This makes attaching the airbag ramps to the any material difficult, e.g., sewing to a headliner is difficult owing to the toughness of the material. By way of example, it is difficult for the suppliers to original equipment manufacturers to sew the ramps to the material, e.g., headliner material, because the tough ramp material is difficult to sew. To overcome this problem, if the ramp material were made thinner for making it easier to sew, then the thinner material could rip or otherwise break, which is yet another significant issue.

Therefore, it is desirable to have an economical side curtain air bag ramp and process for manufacturing same that incorporates an easily manufactured design and that is easier for customer install to an air bag device, e.g., sewn, fastener, clipped, etc.

SUMMARY OF THE INVENTION

The present invention is generally directed to an airbag ramp, in particular, to an extruded side curtain airbag ramp and method for manufacturing same. The airbag ramp according to the present invention incorporates a plurality of extruded materials and provides an easier manufactured product and attachment.

According to one preferred embodiment of the present invention the airbag ramp incorporates at least two materials, preferably, at least three materials, more preferably at least four materials. A first material is a predetermined material that is hard. A second material is a predetermined material that is tear resistant. A third material is a predetermined material that is a softer material than at least the first material. The second material is suitable to allow operable connection to an airbag, in particular, preferably to the material of the headliner. Preferably, the second material allows the airbag ramp to be sewn to the airbag. Alternatively, the airbag ramp incorporates at least one fastener (e.g., at least one retainer, clip, extruded fastener, channel, barb, etc) to operably connect to the airbag without the need to sew, or alternatively, in addition to sewing.

The fabrication of the airbag ramp is preferably an in-line up/down process incorporating at least two extruders. In accordance with one preferred embodiment of the present invention, at least a first extruder and a second extruder are provided. At least one of the materials is extruded or a plurality co-extruded at the first extruder forming predetermined features/profiles. The extrusion then runs into at least one mid-line fabrication device (e.g., at least one die, bulb die, etc) to cut away or otherwise remove any predetermined material that is not needed in the end product to thereby begin to form or profile the product. The part is then run into the second extruder for extruding at least one of the other materials. More extruders and mid-line fabrication devices are contemplated depending on the application without departure from the scope of the present invention. The process in accordance with the present invention is easier to install or otherwise attach to a part and adds more value to manufacturing and the end product than conventional fabrication of airbag ramps.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a front elevation view of an airbag ramp, in accordance with the present invention;

FIG. 2 is a front elevation view of an airbag ramp, in accordance with the present invention;

FIG. 5 is a schematic of a system for manufacturing an airbag ramp.

DETAILED DESCRIPTION OF THE PREFERRED EMBODIMENTS

Figure 3:
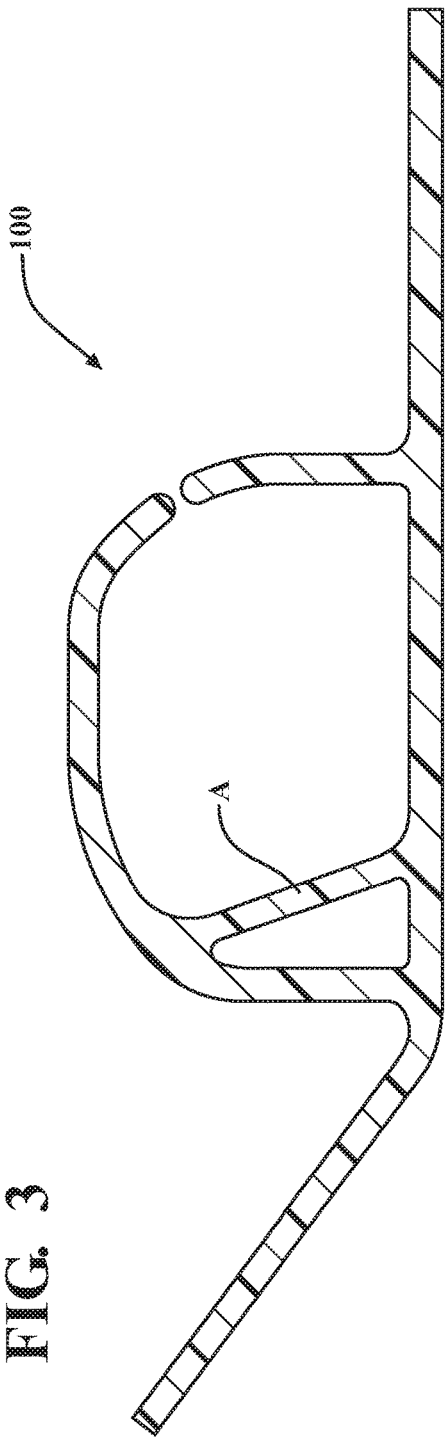
FIG. 3 is a front elevation view of an airbag ramp with a stiffening feature.

The following description of the preferred embodiment(s) is merely exemplary in nature and is in no way intended to limit the invention, its application, or uses.

Referring to FIGS. 1-5 generally, and more particularly to FIGS. 1-2, in accordance with the present invention there is provided an extruded airbag ramp shown generally at 10. The airbag ramp 10 is preferably a side curtain airbag ramp. The airbag ramp 10 has many significant advantages, including, that the airbag ramp 10 is operable for easier manufacturing and for connecting to an airbag easier, e.g., sewing or clipping to a part, e.g., sewing to a headliner. The airbag ramp 10 includes a plurality of predetermined materials, wherein at least one of the materials is a hard material and at least one of the materials is a material that is softer than the hard material. Preferably, at least one other of the materials is a tear-resistant material.

A first portion of the airbag ramp, shown generally at 12, is formed of a first material. The first material is preferably the hardest of all the other materials of the ramp 10. The first material is a preferably a polypropylene. Typically, the first material portion has a durometer of about 50 D, however, greater or lesser durometers are contemplated depending on the application without departure from the scope of the present invention. The first portion 12 has a predetermined shape and dimensions (e.g., profile(s), shape(s), contour(s), thickness(s), length(s), width(s), height(s), etc) depending on the particular application. FIG. 1 depicts the first portion 12 with an exemplary generally horizontal section 13a and a generally vertical section 13b with a generally curved section indicated generally at 13c. Preferably, the sections 13a-13c are integrally formed in the same extruder, e.g., a first extruder, as will be described further below. FIG. 2 depicts the first portion 12 of the first material with an exemplary predetermined profile that does not include the generally horizontal section 13a of FIG. 1. It is understood that the exemplary sections in the Figures are adaptable to any application and can be any predetermined configuration depending on the particular application without departure from the scope of the present invention.

A second portion of the airbag ramp, shown generally at 14, is formed of a second material. The second material is softer than the first material. The second material is preferably a thermoplastic olefin (TPO). Typically, the second material portion has a durometer of about 50 B, however, greater or lesser durometers are contemplated depending on the application without departure from the scope of the present invention. The second portion 14 has a predetermined shape and dimensions (e.g., profile(s), shape(s), contour(s), thickness(s), length(s), width(s), height(s), etc) depending on the application. FIG. 1 depicts the second portion 14 with an exemplary generally horizontal first section 15a. The second portion 14 further includes another portion 15c (FIGS. 1-2) or ramp section formed of the second material, e.g., extruded or co-extruded. The portion 15c adjoins the structural section 12 at one end. The first portion 15a adjoins the structural section 12, preferably, the generally horizontal first section 13a of the structural portion 12 at the other end. FIG. 2 depicts the second portion 14 with an exemplary generally horizontal first section 15a including a further extending generally horizontal second section 15b adjoining to the first portion 12/13b. The second portion 14 further includes a third portion 15c (FIGS. 1-2) or ramp section formed of the second material, e.g., extruded or co-extruded. The third portion 15c adjoins the structural section 12. A channel 23 is formed by the cooperating sections 12 and 14 to receive a predetermined suitable component. The channel 23 generally runs the length of the assembly 10. It is understood that the exemplary sections in the Figures are adaptable for suitability in any application and can be any predetermined configuration depending on the particular application without departure from the scope of the present invention. It is understood that the assembly 10 is any predetermined length depending on the application without departure from the scope of the present invention.

Alternatively, the ramp section 15c is at least partly formed of a third material, typically a soft material, preferably thermoplastic vulcanizates (TPV). FIGS. 1-2 illustrate at least the end 15d of the ramp section 15c being TPV, which may be a cut away or otherwise formed end 15d in a mid-line fabrication device, as will be described in greater detail below.

Figure 4:
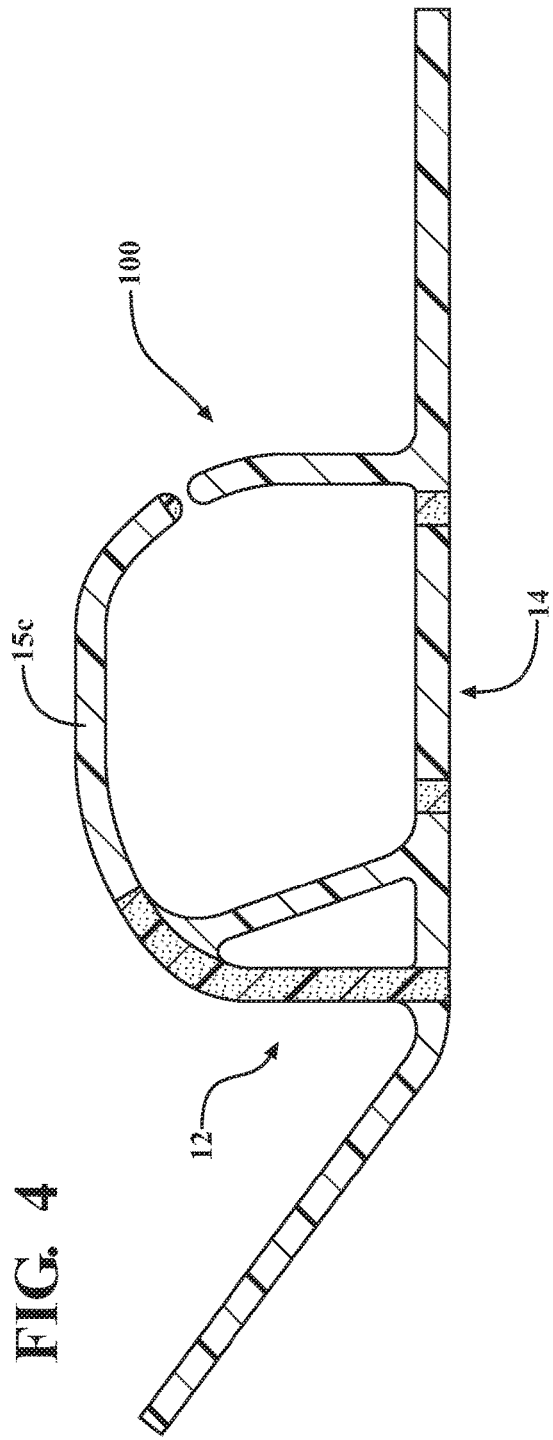
FIG. 4 is a front elevation view of an airbag ramp illustrating features of the present invention operable for eliminating the stiffening feature, in accordance with the present invention.

Referring to FIGS. 1-5 generally, and more particularly to FIG. 4 the use of the hard material eliminates the need for additional strengthening features, such as the expanse of material "A" indicated in FIGS. 3 and 4 located generally between the horizontal and ramp segments of an airbag ramp 100.

Referring to FIGS. 1-2 generally, the airbag ramp 10 includes at least one attachment portion 16 formed of a third material. The third material is preferably a predetermined tear-resistant material or anti-tear material. Preferably, there are at least two attachment portions 16 and 16 (see FIGS. 1-2). Most preferably, each attachment portion 16 is operable for sewing the airbag ramp 10 to at least one predetermined vehicle part 21, e.g., vehicular body panel, headliner, both the vehicular body panel and headliner, etc. An exemplary sew line is indicated at 17. Alternatively, or in combination with sewing, adhesive, or any other suitable attachment, at least one fastener 19 is incorporated with the airbag ramp 10 (e.g., at least one retainer, clip, extruded fastener, channel, barb, etc) for attachment to the predetermined vehicle part. Other vehicle components for the airbag ramp to be attached to are contemplated depending on the application without departure from the scope of the present invention. Alternatively, the attachment portion 16 is formed as the same material as the structural portion 13b.

It is understood that the profile and shape and contour and features and etc of the airbag ramp 10 are adaptable for suitable use in any airbag for any vehicle, etc depending on any and all applications without departure from the scope of the present invention.

It is understood that the materials and locations are exemplary. It is understood that the portions and part profiles are exemplary. The airbag ramp part is adaptable for suitability according to any application without departure from the scope of the present invention.

Referring to FIGS. 1-5 generally, and more particularly to FIG. 5, according to an aspect of the present invention, the fabrication of the airbag ramp is preferably an in-line up/down process incorporating at least two extruders shown generally at 200. In accordance with one preferred embodiment of the present invention, at least a first extruder 202 and at least one second extruder 206 are provided. At least one of the materials (e.g., first material 12, preferably first 12 and second materials 14 and third 16 materials), is extruded (or co-extruded) at the first extruder 202 forming predetermined features/profiles and runs into at least one mid-line fabrication device 204 (e.g., at least one die, bulb die, etc) to cut away or otherwise remove any predetermined material that is not needed in the end product to thereby begin to form or profile the product. The part is then run into the second extruder 206 for extruding at least one of the other materials (e.g., 15d). The process in accordance with the present invention is easier and adds more value to the end product than conventional fabrication of airbag ramps.

While a side curtain airbag ramp is described, it is understood that the present invention is adaptable for any airbag (e.g., front driver, front passenger) without departure from the scope of the present invention and adaptable for any extrusion in industry (e.g., UTV, ATV, recreational vehicle, offroad vehicles) without departure from the scope of the present invention. It is further understood that the present invention is adaptable depending on the application without departure from the scope of the present invention, e.g., requiring an extrusion attached to a second component, seals, etc.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. An extruded airbag ramp, comprising:
 a plurality of materials, wherein at least one of the materials is a hard material for a structural portion of the airbag ramp and at least one of another of the materials is a tear-resistant material providing at least one attachment portion suitable to operably attach said airbag ramp to another predetermined part;
 wherein said extruded airbag ramp is a side curtain airbag ramp and is operably connected to said part, wherein said part is a headliner for a vehicle; and
 wherein the structural portion of said airbag ramp is sewn to said part.

2. The extruded airbag ramp of claim 1, wherein the tear-resistant material is sewn to the part.

3. The extruded airbag ramp of claim 1, wherein the attachment portion includes at least one fastener attachable to said part.

4. The extruded airbag ramp of claim 3, wherein the at least one fastener is at least one clip.

5. The extruded airbag ramp of claim 1, where the plurality of materials includes at least one third material that is tear-resistant.

6. The extruded airbag ramp of claim 1, wherein the structural portion of said airbag ramp has a higher durometer than said tear-resistant material.

7. The extruded airbag ramp of claim 1, wherein the structural portion provides predetermined amount of stiffness to eliminate an expanse of material required for strengthening substantially between the structural portion and attachment portion.

8. The extruded airbag ramp of claim 1, wherein the structural portion and attachment portion together form a channel.

9. The extruded airbag ramp of claim 1, a durometer of at least one material is at least about 50D.

10. The extruded airbag ramp of claim 1, wherein at least one material is thermoplastic vulcanizates.

11. The extruded airbag ramp of claim 1, wherein the attachment portion of tear-resistant material is bounded on both sides by polypropylene material.

12. An extruded airbag ramp for a vehicle, comprising:
 a plurality of materials that are co-extruded, wherein at least one of the materials has predetermined stiffness adapted for a structural portion of the airbag ramp to adjoin less stiff materials, and at least one of another of the materials is a tear-resistant material providing a plurality of attachment portions suitable to operably attach said extruded airbag ramp to another predetermined part of said vehicle;
 wherein another of said plurality of materials is a softer material forming an arched ramp portion and a base portion of said extruded airbag ramp and adjoining both ends of the structural portion and adjoining each side of the plurality of attachment portions, wherein said arched ramp portion, base portion and structural portion form a channel and the structural portion is adapted to provide stiffness that allows elimination of an expanse of material within the channel.

* * * * *